UNITED STATES PATENT OFFICE.

THOMAS ROUSE, OF LONDON, ENGLAND.

AGGLOMERATING OR BRIQUETING COPPER-ORE CONCENTRATES PREPARATORY FOR SMELTING.

955,909. Specification of Letters Patent. Patented Apr. 26, 1910.

No Drawing. Application filed July 9, 1909. Serial No. 506,828.

*To all whom it may concern:*

Be it known that I, THOMAS ROUSE, a British subject, residing at "The Poplars," 6 West Bank, Stamford Hill, London N., England, have invented new and useful Improvements in Agglomerating or Briqueting Copper-Ore Concentrates Preparatory for Smelting, of which the following is a specification.

The wet copper concentrates, containing more or less water amounting to about one third their bulk, are first mixed in any suitable way with not more powdered coal, coke or charcoal than suffices for smelting, being about a twelfth of the bulk of the concentrates. A measure of this mixture is next mixed in a suitable way, by machine or otherwise with one measure of a weak solution of waterglass. This solution is prepared with water containing ferric oxid in quantity determinable by analysis of the concentrates. A solution consisting of one measure of commercial waterglass 140° Twaddell with about fifteen measures of water suffices. If the commercial waterglass is so concentrated as to be gelatinous it is reduced to 140° Twaddell before dilution with fifteen measures of water. Silicate of sodium in other form may be used to prepare the solution. Whatever the method of preparing the weak waterglass solution, if the bulk of water in the concentrates is more or less than one third, the strength of the weak solution of waterglass may be adjusted to suit. The object of using the silicate of sodium in solution is to thoroughly coat every particle of the concentrates and fuel mixed therewith with a thin film of silicate of sodium. I found it possible to briquet wet concentrates of a poor copper sulfid with 70 lbs. to the ton of a solution containing about 90 lbs. of solid waterglass dissolved to make 36 gallons by the addition of water containing 1½ per cent. hydrated ferric oxid, but this percentage may be more or less if required. If the concentrates have become dry by exposure to the air or have been dried, it is not necessary to add coke dust, this being added principally to take up some of the excess moisture so that the mass may be of suitable consistency for molding into briquets by any suitable means. The use of powdered fuel in this way is however a useful method of employing fine powdered fuel and prevents its being blown out of the smelting furnace. Ore dust, with or without the addition of metalliferous flue dust may be mixed with the concentrates and powdered fuel when preparing the plastic mass for molding the briquets. The preparation of dry blocks of concentrates in the way described greatly adds to the capacity of the furnaces and makes their output better and more regular. The combustion is not as under present conditions damped by the frequent addition of fresh wet charges and there is consequently scarcely any disengagement of noxious vapors loaded with flue dust, the furnace men are thus enabled to work in comfort under healthier conditions.

When the molded briquets are to be smelted forthwith they are by preference exposed to a temperature of about 400° Fah. for a few minutes on their way to the smelting furnace; any drying temperature continued for a suitable time will however answer the purpose; but if the briquets are to be prepared for carriage to a distance the exposure to a temperature of 400° Fah. should be continued for about half an hour.

The waste gases from the smelting furnace may be utilized to heat the briquets.

What I claim as my invention, and desire to secure by Letters Patent, is:—

The process of agglomerating into lumps or briquets by means of a weak solution of waterglass in water containing ferric oxid, copper ore concentrates preparatory for smelting, substantially as herein described.

In testimony whereof I have signed my name to this specification in the presence of two subscribing witnesses.

THOMAS ROUSE.

Witnesses:
   THOS. WILKINS,
   C. RICHARDS.